Oct. 22, 1968   E. E. SEILER   3,406,930
FISHING ROD CARRIER
Filed Jan. 9, 1967
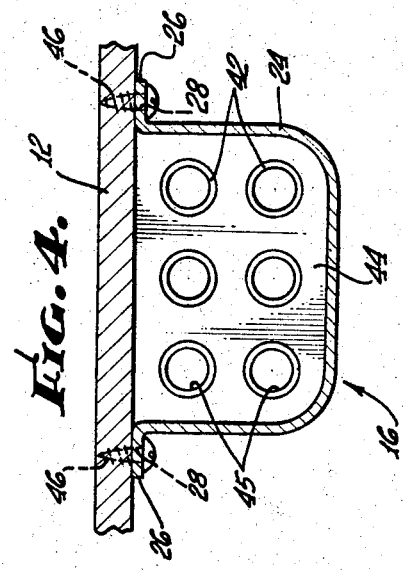
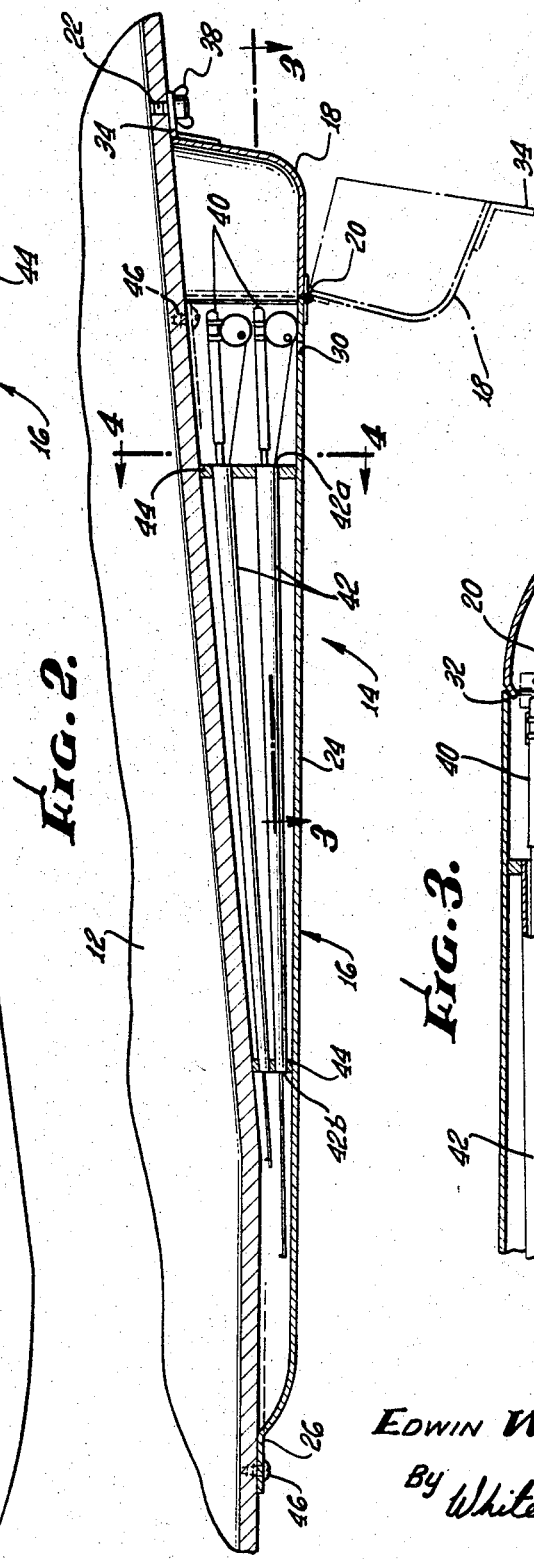
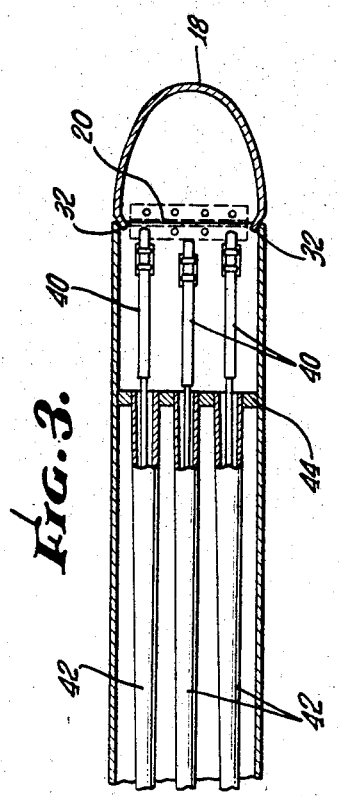
INVENTOR.
EDWIN W. SEILER
By White & Haefliger
ATTORNEYS.

3,406,930
FISHING ROD CARRIER
Edwin E. Seiler, 1617 Warnall Ave.,
Los Angeles, Calif. 90024
Filed Jan. 9, 1967, Ser. No. 608,234
6 Claims. (Cl. 244—118)

ABSTRACT OF THE DISCLOSURE

The invention provides a fishing rod receptacle to be carried by aircraft, and structurally contemplates an open top elongated shell attachable to the underside of the aircraft, the shell being provided at one end with an operable closure for insertion and removal of the rods, and the shell containing individual rod holders, preferably of tubular form, to separately receive the rods individually and thus maintain them against damage and entanglement.

*Background of the invention*

This invention has to do with the transportation of sports equipment and, more particularly, to improved means for the aerial transportation of fishing rods. In general, the invention provides apparatus for the transportation of fishing rods without the usual entangling of lines, leaders, hooks and lures which apparatus includes an elongated open top shell adapted to be attached to the underside of an airplane fuselage and means within the shell for maintaining adjacent fishing rods separate one from another.

An increasing number of fishing enthusiasts travel from one fishing spot to another by means of small private planes. Because of the rather small stowage areas in such planes, hard-to-store equipment such as fishing rods, has had to be disassembled on leaving each fishing area and then reassembled upon reaching the next area, with a loss of fishing time. Reassembly often entails disentangling of various rod lines, increasing the amount of time lost.

*Summary of the invention*

This invention provides a fishing rod carrying apparatus which overcomes these difficulties. The apparatus of the invention, which is easily adaptable to all types of private aircraft, includes an elongated open top shell adapted to be attached to the underside of an airplane fuselage, fishing rod receiving means within the shell for receiving an maintaining separate adjacent fishing rods and means for securing the shell to the fuselage.

*Brief description of the drawings*

The invention will be further described in conjunction with the attached drawings in which:

FIG. 1 is a view in side elevation of the apparatus of the present invention shown attached to an airplane fuselage;

FIG. 2 is an enlarged side elevation view, generally in section showing the shell in attached arrangement;

FIG. 3 is a plan view in section taken on line 3—3 in FIG. 2; and

FIG. 4 is a cross section of the shell taken on line 4—4 in FIG. 2.

*Description of the preferred embodiments*

Referring now to the drawings in detail in FIG. 1 an airplane, generally indicated at 10, having fuselage 12 is shown with fishing rod carrier 14 attached to the underside of the fuselage. The fishing rod carrier includes an elongated, open top shell 16, extending along the fuselage 12 between the forward (propeller) end and the rearward (tail section) end. An aerodynamic contour is given the shell to minimize wide resistance and drag during flight. Advantage is taken of the configuration of the fuselage underside to provide maximum depth in the shell with minimum protrusion of the shell through the aerodynamic contour of the airplane. At the rearwardmost, maximum depth portion of the shell 16 there is provided a closure 18 hinged at 20 and secured closed to the fuselage 12 by fastener 22.

Referring now to FIG. 2, the shell 16 comprises a wall 24 having a deep U configuration at the rear of the shell and vertically tapering forwardly to a shallow U at the forward end of the shell. Wall 24 extends upwardly, defining the sides of the shell and terminates in flange portion 26 provided with fastener receiving openings 28. At the usually lowermost area of wall 24 a drain opening 30 is provided for removing any water from within the shell.

Closure 18 provides a closeable access to shell 16 and, as shown in FIG. 3, has a tear-drop shape designed to minimize after turbulence during flight. Otherwise shaped closures can be used provided the access opening in shell 16 is closeable thereby. Additionally, closure 18 is provided with vertical ears 32 to facilitate secure engagement of closure 18 with wall 24 to minimize vibration and prevent water entry into the shell. Side hinged closure as well as the illustrated bottom hinged closure can be employed. A bottom hinged closure is conveniently fastenable to the fuselage, e.g. by means of a latch tongue 34 and a cooperating fastener such as threaded fastener 22 extending from the fuselage through tongue 34 and having wing nut 38.

Importantly, fishing rods such as rod 40, carried in the apparatus of the present invention are maintained separate and apart at least to the extent of the lines, leads and lures, to prevent entanglement of these parts during travel. Means for achieving separation are shown in FIGS. 2 and 3 to include a plurality of individual rod receiving means, tubular members 42, extending a major portion of the shell length and maintained in spaced relation by a pair of spaced transverse supports 44 which can be a wall having tubular member receiving openings 45 or a strut extending across shell 16. Transverse supports 44 are secured to the shell wall in any suitable manner. For convenience of their removal to provide an open stowage volume, these supports can be held by adjustable fasteners.

Tubular members 42 are tapered to a reduced cross section from fishing rod inlet 42a to member terminus 42b to be receivable within the progressively reduced cross section of shell 16 as wall 24 thereof changes from a deep U to a shallow U configuration in moving forwardly along the plane fuselage. This progressive taper, or reduction in cross section is primarily in the vertical extension of the shell and to a lesser degree in its horizontal extension and is desirably, but not necessarily, uniform along the length of the fishing rod receiving means.

The shell and fishing rod receiving tubes can be fabricated of any convenient, desirably non-rusting material, such as plastic, aluminum or painted or plastic-coated steels. For optimum water resistance, tensile and compressive strength and light weight, the shell and tubes are preferebaly fabricated of reinforced plastic material, for example, glass cloth impregnated with thermoplastic or thermosetting resin, such as polyester resin. Other forms of reinforcement include fibers either non-woven or woven including such reinforcement as sisal, burlap, chopped glass fibers and other forms of natural and synthetic fibers.

The fishing rod carrying apparatus of the present invention is used by attaching an appropriately configured shell 16 to the underside of the fuselage of a small plane by inserting fasteners 46 through screw receiving holes 28 in the flange 26, inserting fishing rods into the fishing rod receiving tubes 42 extending lengthwise in the shell, closing closure 18 and securing tongue 34 with fastener 22 to the underside of the fuselage 12.

Shell 16 provides ample room for the bulky handle and reel portion of a fishing rod and yet, by taking advantage of the normal up-sweep of the rearward fuselage, is close fitting to the fuselage of the plane and, thereby having only a small projection below the fuselage at the most forward portion of the shell, drag is minimized during flight.

I claim:

1. A multiple fishing rod carrier adapted to be attached to the underside of an airplane fuselage, comprising an elongated, open-top shell the length of which is in excess of the length of conventional fishing rods to be carried, means for securing the shell to the fuselage, a plurality of tubes open throughout and extending longitudinally within the shell and supported in spaced relation to contain individual poles beyond their reel or handle ends, and a closure for one end of the shell which is openable for access to the handle ends of the poles.

2. A fishing rod carrier according to claim 1, in which said securing means comprises a peripheral shell flange, said closure being hinged to the shell, and the carrier including means for releasably attaching the closure to the fuselage.

3. A fishing rod carrier according to claim 1, in which the bottom of the shell tapers upwardly from its closure end and forwardly of the fuselage in the applied condition of the shell.

4. A fishing rod carrier according to claim 3, in which said tubes are disposed in planes converging in the direction of the shell taper.

5. A fishing rod carrier according to claim 4, in which the tubes are individually tapered in the direction of the shell taper.

6. A fishing rod carrier according to claim 4, in which said closure is a downwardly swingable end section of the shell.

References Cited

UNITED STATES PATENTS

| 2,553,207 | 5/1951 | Peltier | 244—118 |
| 2,683,005 | 7/1954 | Frost | 244—118 |
| 2,721,680 | 10/1955 | Steckman | 224—29 |
| 2,879,819 | 3/1959 | Turnbull | 150—1.5 |
| 3,057,588 | 10/1962 | Kolbe | 244—135 |

OTHER REFERENCES

Aviation Week: Oct. 27, 1952, p. 35.

MILTON BUCHLER, *Primary Examiner.*

T. W. BUCKMAN, *Assistant Examiner.*